(12) United States Patent
Suzuki et al.

(10) Patent No.: US 10,663,634 B2
(45) Date of Patent: May 26, 2020

(54) ND FILTER WITH PLASTIC BASE MATERIAL, AND ND FILTER WITH PLASTIC BASE MATERIAL FOR EYEGLASSES

(71) Applicant: TOKAI OPTICAL CO., LTD., Okazaki-Shi (JP)

(72) Inventors: Ryosuke Suzuki, Okazaki (JP); Hirotoshi Takahashi, Okazaki (JP)

(73) Assignee: Tokai Optical Co., Ltd., Okazaki-Shi (JP)

( * ) Notice: Subject to any disclaimer, the term of this patent is extended or adjusted under 35 U.S.C. 154(b) by 171 days.

(21) Appl. No.: 16/058,098

(22) Filed: Aug. 8, 2018

(65) Prior Publication Data

US 2018/0348414 A1    Dec. 6, 2018

Related U.S. Application Data

(63) Continuation of application No. PCT/JP2017/005732, filed on Feb. 16, 2017.

(30) Foreign Application Priority Data

Feb. 23, 2016 (JP) ................ 2016-032332

(51) Int. Cl.
*G02B 1/14* (2015.01)
*G02B 5/20* (2006.01)
(Continued)

(52) U.S. Cl.
CPC ............. *G02B 5/205* (2013.01); *B32B 7/02* (2013.01); *B32B 9/00* (2013.01); *G02B 1/115* (2013.01);
(Continued)

(58) Field of Classification Search
CPC ... G02B 1/14; G02B 5/20; G02B 5/22; G02B 1/10
(Continued)

(56) References Cited

U.S. PATENT DOCUMENTS 7,666,527 B2 *   2/2010   Okami ............... G02B 5/205
                                          359/585
2003/0026014 A1   2/2003   Kunii
(Continued)

FOREIGN PATENT DOCUMENTS

JP   2003-043211 A   2/2003
JP   2003-175561     6/2003
(Continued)

OTHER PUBLICATIONS

Extended European Search Report dated Sep. 2, 2019 from a corresponding European patent application (EP 17756349.1), 8 pages.
(Continued)

*Primary Examiner* — Hung X Dang
(74) *Attorney, Agent, or Firm* — Burr & Brown, PLLC (57) ABSTRACT

In a neutral density filter, a base is formed from plastic, and a light absorbing film having a plurality of layers is disposed on at least one surface of the base. The light absorbing film includes a first layer from the base side that is a $SiO_2$ layer or an $Al_2O_3$ layer. The light absorbing film includes one or more $NiO_x$ layers formed from $NiO_x$ (x is not less than 0 and not greater than 1). At least one of the $NiO_x$ layers is disposed between a base-side adjacent layer adjacent to the at least one of the $NiO_x$ layers on the base side, and an opposite-side adjacent layer which is formed from a material different from the base-side adjacent layer and which is adjacent to the at least one of the $NiO_x$ layers on the opposite side.

8 Claims, 6 Drawing Sheets

(51) Int. Cl.
  *G02B 1/115* (2015.01)
  *G02C 7/10* (2006.01)
  *B32B 7/02* (2019.01)
  *G02B 5/00* (2006.01)
  *B32B 9/00* (2006.01)

(52) U.S. Cl.
  CPC ............... *G02B 1/14* (2015.01); *G02B 5/00* (2013.01); *G02C 7/10* (2013.01)

(58) Field of Classification Search
  USPC ............................. 359/588, 885, 589, 585
  See application file for complete search history.

(56) References Cited

U.S. PATENT DOCUMENTS

| | | |
|---|---|---|
| 2006/0279866 A1 | 12/2006 | Kunii |
| 2012/0069295 A1 | 3/2012 | Fukagawa et al. |
| 2014/0154769 A1 | 6/2014 | del Ninno et al. |
| 2015/0140271 A1 | 5/2015 | Chen et al. |

FOREIGN PATENT DOCUMENTS

| | | |
|---|---|---|
| JP | 2009-157211 | 7/2009 |
| JP | 2009-157211 A | 7/2009 |
| JP | 2009-162852 | 7/2009 |
| JP | 2009-162852 A | 7/2009 |
| JP | 2011-002515 A | 1/2011 |
| JP | 5066644 B2 | 11/2012 |
| JP | 2014-002270 A | 1/2014 |
| WO | 2005/047940 A1 | 5/2005 |

OTHER PUBLICATIONS

International Search Report (with English translation) and Written Opinion, International Application No. PCT/JP2017/005732, dated May 16, 2017 (11 pages).

\* cited by examiner

ND FILTER WITH PLASTIC BASE MATERIAL, AND ND FILTER WITH PLASTIC BASE MATERIAL FOR EYEGLASSES

This application is a Continuation of International Application No. PCT/JP2017/005732, filed on Feb. 16, 2017, which claims the benefit of Japanese Patent Application Number 2016-032332 filed on Feb. 23, 2016, the disclosures of which are incorporated by reference herein in their entireties.

BACKGROUND OF INVENTION

Field of the Invention

The present invention relates to a Neutral Density (hereinafter referred to as "ND") filter with a plastic base, and a ND filter with a plastic base for eyeglasses.

Description of the Background Art

As a ND filter, the ND filter disclosed in Japanese Patent No. 5066644 is known.
The ND filter has a structure in which a plurality of light absorbing films and a plurality of dielectric films are layered and formed on one or both surfaces of a transparent substrate, and the light absorbing film contains elemental germanium or elemental silicon and a mixture (Ni+NiO$_x$) of nickel and an oxide of nickel.

SUMMARY OF THE INVENTION

Japanese Patent No. 5066644, it is suggested that the substrate is formed from reinforced glass or plastic. From the viewpoint of light weight, break resistance, and easy dyeability, a plastic substrate is preferable, and is preferable, in particular, for spectacles.
When the substrate is formed from plastic, it needs to be considered that the plastic easily absorbs moisture, and the absorbed moisture is easily released. That is, moisture released from the substrate gradually acts on the light absorbing film or the dielectric film on the-substrate. This may gradually reduce adhesion of these films and gradually deteriorates weather resistance and the like. Japanese Patent No. 5066644 does not particularly describe moisture from the plastic substrate, and there is room for further improving lifespan such as weather resistance in the technique disclosed in Japanese Patent No. 5066644 (plastic substrate).
Therefore, an object of the invention described in claims 1 and 8 is to provide a ND filter and a ND filter, for spectacles, each of which has a base (substrate) formed from plastic, and has an excellent durability.
In order to achieve the aforementioned object, a first aspect of the disclosure provides a neutral density (ND) filter that includes a base formed from plastic and a light absorbing film disposed on at least one surface of the base, the light absorbing film having a plurality of layers. The light absorbing film includes a first layer from a base side that is a SiO$_2$ layer formed from SiO$_2$ or an Al$_2$O$_3$ layer formed from Al$_2$O$_3$. The light absorbing film includes at least one of one or more NiO$_x$ layers formed from NiO$_x$ where x is not less than 0 and not greater than 1 and one or more CoO$_{x'}$ layers formed from CoO$_{x'}$ where x' is not less than 0 and not greater than 1.5. The at least one of the NiO$_x$ layers and the CoO$_{x'}$ layers is disposed between a base-side adjacent layer which is adjacent to the at least one layer on the base side, and an opposite-side adjacent layer which is formed from a material different from the base-side adjacent layer and which is adjacent to the at least one layer on an opposite side.
According to a second aspect, in the aforementioned disclosure, the NiO$_x$ layers and the CoO$_{x'}$ layers each have a physical film thickness that is not greater than 6 nanometers.
According to a third aspect, in the aforementioned disclosure, the base-side adjacent layer or the opposite-side adjacent layer is a silica compound layer formed from a silica compound.
According to a fourth aspect, in the aforementioned disclosure, the SiO$_2$ layer or the Al$_2$O$_3$ layer has a density as obtained when deposition is performed without ion-assisting.
According to a fifth aspect, in the aforementioned disclosure, the light absorbing film is formed by low refractive index layers and high refractive index layers being alternately disposed.
According to a sixth aspect, in the aforementioned disclosure, the base has a front surface and a back surface, and the light absorbing film is disposed on the back surface.
According to a seventh aspect, in the aforementioned disclosure, an antireflection film is disposed on the front surface.
An eighth aspect of the disclosure provides a ND filter, for eyeglasses, having a plastic base, and the ND filter includes the ND filter, having the plastic base, according to the above-described aspects.
According to the present invention, a ND filter and a ND filter, for spectacles, each of which has a base formed from plastic and has an excellent durability, can be obtained.

DESCRIPTION OF THE PREFERRED EMBODIMENTS

Hereinafter, an exemplary embodiment according to the present invention will be described with reference to the drawings as appropriate. The present invention is not limited to the following examples.
A ND filter according to the present invention is a filter that uniformly absorbs at least light (visible light) having a wavelength in a visible region (for example, not less than 400 nanometers (nm) and not greater than 800 nm, not less than 400 nm and not greater than 760 nm, not less than 400 nm and not greater than 700 nm, not less than 410 nm and not greater than 760 nm, or not less than 420 nm and not greater than 760 nm).

A base of the ND filter is formed from a transparent (including translucent as appropriate) plastic. Examples of a material of the base include polyurethane resin, thiourethane resin, episulfide resin, polycarbonate resin, acrylic resin, polyether sulfone resin, poly(4-methylpentene-1) resin, and diethylene glycol bis(allyl carbonate) resin.

The base may be a convex lens, a concave lens, or a flat lens, and may have any power and progressive power.

The ND filter of the present invention can be used for any application as long as the base is formed from plastic. The ND filter of the present invention is preferably used for a camera by the ND filter being included in a part of a camera lens system (for example, used for protecting another lens or incorporated in a camera body) or similarly used for projectors, binoculars, and telescopes, and more preferably used for spectacles (used as a spectacles lens itself or used as a lens for covering a spectacles lens).

An optical multilayer film is formed on one surface or both surfaces of the base.

The optical multilayer film mainly has a function of uniformly absorbing visible light, and further has a function of preventing reflection of the visible light as appropriate. The optical multilayer film or a portion thereof for absorbing visible light is a light absorbing film. When the light absorbing film is formed from one layer, the light absorbing film may be a light absorbing layer. Furthermore, the optical multilayer film or a portion thereof for preventing reflection of visible light is an antireflection film. The antireflection film may include a light absorbing film. In a case where the optical multilayer films are disposed on both the surfaces of the base, both the optical multilayer films may have the same structure, or may have different structures.

The optical multilayer film may be formed from a light absorbing film only. The optical multilayer film may have an antifouling film or a protective film added on the front surface side (air side) of the light absorbing film. The optical multilayer film may have a single or a plurality of intermediate layers, such as a hard coating film, which is added on the base side of the light absorbing film. The optical multilayer film may have a single or a plurality of layers or films added inside or outside the light absorbing film, for another purpose such as improvement of conductivity. The optical multilayer film may be obtained by combination of above-described layers and/or films. A hard coating film, a conductive layer, an antireflection film, or the like may not be included in the optical multilayer film. Each of them or a combination thereof may be formed as a separate optical multilayer film.

The hard coating film is formed from, for example, an organosiloxane compound, or is formed from an organosilicon compound or an acrylic compound.

As an underlayer (layer on the base side) of the hard coating film, a primer layer may be formed. The primer layer is formed from, for example, at least one of polyurethane-based resin, acrylic resin, methacrylic resin, and organosilicon resin.

The antireflection film is formed from, for example, a plurality of kinds of dielectric materials including a low refractive index material and a high refractive index material. As the low refractive index material, for example, at least one of silicon oxide (in particular, $SiO_2$) and magnesium fluoride (in particular, $MgF_2$) is used. As the high refractive index material, for example, at least one of zirconium oxide (in particular, $ZrO_2$), titanium oxide (in particular, $TiO_2$), tantalum oxide (in particular, $Ta_2O_5$), and niobium oxide (in particular, $Nb_2O_5$) is used. The antireflection film is preferably formed such that the low refractive index materials and the high refractive index materials are alternately layered by one of the low and the high refractive index materials being positioned on the base side.

The light absorbing film is formed so as to include one or more light absorbing layers formed from at least one of nickel (Ni) and cobalt (Co).

Although elemental Ni may be used, an unsaturated metal oxide film ($NiO_x$; x is greater than 0 and not greater than 1) is preferably used. For example, Ni is a deposition material and deposited in a state where oxygen gas is supplied into a deposition vacuum device at a predetermined flow rate, whereby the value of x can be adjusted. When no oxygen gas is caused to flow, x=0 (elemental) is satisfied.

Although elemental Co may be used, an unsaturated metal oxide film ($CoO_{x'}$; x' is greater than 0 and not greater than 1.5) is preferably used. For example, Co is a deposition material and deposited in a state where oxygen gas is supplied into a deposition vacuum device at a predetermined flow rate, whereby the value of x' can be adjusted. When no oxygen gas is caused to flow, x'=0 (elemental) is satisfied.

The light absorbing film may be formed as a multilayer film having another layer. In this case, examples of the other layer include a $SiO_2$ layer, a $ZrO_2$ layer, an aluminium oxide (in particular, $Al_2O_3$) layer, a silica compound layer, and a combination thereof. The silica compound is a silicon compound or a mixture of a silicon compound and another compound. The silica compound is preferably a mixture of silicon oxide and aluminium oxide, and is more preferably a mixture of $SiO_2$ and $Al_2O_3$.

At least one light absorbing layer, that is, at least one of the $NiO_x$ layer (x is not less than 0 and not greater than 1) and the $CoO_{x'}$ layer (x' is not less than 0 and not greater than 1.5) has an adjacent layer on the base side and an adjacent layer thereof on the opposite side (air side). The adjacent layer on the base side and the adjacent layer on the opposite side are formed from different materials, respectively. For example, the adjacent layer on the base side is an $Al_2O_3$ layer, and the adjacent layer on the opposite side is a silica compound layer.

In a case where a plurality of $NiO_x$ layers are disposed, the adjacent layer, on the base side, of at least one of the $NiO_x$ layers and the adjacent layer thereof on the opposite side may be formed from different materials, respectively. Meanwhile, in a case where a plurality of $CoO_{x'}$ layers are disposed, the adjacent layer, on the base side, of at least one of the $CoO_{x'}$ layers and the adjacent layer thereof on the opposite side may be formed from different materials, respectively. In a case where both one $NiO_x$ layer and one $CoO_{x'}$ layer are disposed, the adjacent layer, on the base side, of at least one of the $NiO_x$ layer and the $CoO_{x'}$ layer and the adjacent layer thereof on the opposite side may be formed from different materials, respectively. Further, in a case where both the $NiO_x$ layer and the $CoO_{x'}$ layer are disposed, and the number of at least one of the $NiO_x$ layer and the $CoO_{x'}$ layer is plural, the adjacent layer, on the base side, of one of the $NiO_x$ layers and the $CoO_{x'}$ layers and the adjacent layer thereof on the opposite side may be formed from different materials, respectively.

The adjacent layer on the base side or the adjacent layer on the opposite side is preferably a silica compound layer because a density of the silica compound layer includes an appropriate moisture permeation such that the silica compound layer allows less moisture permeation as compared to a density of the $ZrO_2$ layer and does not have an ultra-high density that allows moisture to be completely sealed.

The first layer (initial layer) from the base side of the light absorbing film is a $SiO_2$ layer or an $Al_2O_3$ layer.

The initial layer of the light absorbing film preferably has a density as obtained without performing ion-assisted deposition. The density of the deposited film such as the initial layer is very difficult to directly measure for a person skilled in the art. Specifying a degree of a density of the deposited film according to whether or not ion assisted deposition is performed is easy and useful for a person skilled in the art.

The light absorbing film may also have a function as an antireflection film in addition to a light absorbing function by low refractive index layers and high refractive index layers being alternately disposed. The $NiO_x$ layer and the $CoO_x$ layer may be handled as the high refractive index layers.

The base preferably has front and back surfaces as a base for spectacles and the like. The front surface of the ND filter base for spectacles is on an environment side, and the back surface thereof is on a face side.

In the optical multilayer film, the antireflection film is preferably disposed on the front surface side of the base, and the light absorbing film is preferably disposed on the back surface side thereof. At present, the antireflection film has a higher durability than the light absorbing film. The antireflection film having a relatively high durability is disposed on the front surface that is exposed to harsher environment, and the light absorbing film is disposed on the back surface that is protected relatively well. Thus, light absorption (ND) and antireflection functions are assured, and durability can be improved as a whole while advantageous properties are obtained.

This ND filter is advantageously used for spectacles. That is, the ND filter itself may be used as a spectacles lens, and the ND filter may be prepared as a filter that covers another spectacles lens.

In general spectacles (sunglasses), an absorption rate for visible light greatly varies for each wavelength in a visible region, and color, contrast, and the like are viewed in a different manner from that by naked eyes. However, the ND filter, for spectacles, according to the present invention uniformly absorbs visible light in a visible region and can thus provide visibility equivalent to that by naked eyes.

EXAMPLES

Next, some preferable examples of the present invention and some comparative examples which do not belong to the present invention will be described (examples 1 to 8, comparative examples 1 to 7). The examples and comparative examples described in the specification are exemplified only for the purpose of describing the present invention unless otherwise stated; therefore, the present invention should not be limited thereto.

As ND filters having plastic bases according to examples 1 to 8 and comparative examples 1 to 7, convex lenses, for spectacles, each having a round shape and having the diameter of 75 millimeters (mm) were produced. In each case, the power was S-4.00, and the shape on the convex surface side (front surface side) was non-spherical, and the thickness was 1.2 mm at the center.

Each of the bases was formed from episulfide resin, and had a refractive index of 1.76, the Abbe number of 30, and the specific gravity of 1.49 g/cm$^3$ (gram per cubic centimeter).

On both the front and back surfaces of the base, hard coating films (HC films) were formed. The hard coating films were formed by the same hard coating solution being applied in the same manner.

The hard coating solution was produced as follows. Firstly, 206 g (gram) of methanol, 300 g of a methanol-dispersed titania sol (made by JGC Catalysts and Chemicals Ltd., solid content was 30%), 30 g of γ-glycidoxypropylmethyldiethoxysilane, and 60 g of tetraethoxysilane were dropped in a container, and 0.01 N (normality) of hydrochloric acid aqueous solution was dropped into the mixed solution. The resultant mixed solution was stirred and hydrolyzed. Next, 0.5 g of flow regulating agent and 1.0 g of catalyst were added, and the resultant solution was stirred at room temperature for three hours, to obtain the hard coating solution.

The hard coating solution was uniformly applied to the surface of the base by a spin coating method, and was then left as it was in an environment of 120° C. for 1.5 hours, whereby the hard coating solution was heat-cured, to obtain the hard coating film.

The physical film thickness of the hard coating film having been thus formed was 2.5 μm (micrometer).

Furthermore, an antireflection film (AR film) and a water-repellent layer were formed on the convex surface (front surface) side of the base.

That is, the base having the hard coating film was set in a fixing tool (dome), and was put into a vacuum device through a door. Thereafter, the door was closed, and the vacuum device was evacuated. The temperature in the vacuum device was maintained at 60° C. in order to remove moisture from the base. When the degree of vacuum in the vacuum device was 1.0E-03 ($1.0\times10^{-3}$) Pa (pascal), the following film formation was started. That is, firstly, the surface of the base was activated by applying oxygen ions to the surface of the base for 60 seconds in order to enhance adhesion between the intermediate layer (hard coating film) and the optical multilayer film to be then formed. Next, $SiO_2$ for a low refractive index material and $ZrO_2$ for a high refractive index material were alternately deposited such that each material was deposited for a predetermined time, and five layers of the antireflection film were formed in total on the convex surface of the base such that each layer had a desired film thickness.

Subsequently, in the vacuum device, a water repellent agent was deposited on the convex surface side of the base having the antireflection film, and the water-repellent layer (top layer) was formed on the antireflection film.

The structures of the optical multilayer films on the convex surface side according to examples 1 to 8 and comparative example 1 to 7 are as indicated below in Table 1. Unless otherwise specified, the film thickness is a physical film thickness.

TABLE 1

| Base•HC film side | | Examples 1 to 8, Comparative examples 1 to 7 | |
|---|---|---|---|
| | | Material and the like | Film thickness [nm] |
| AR film-formed convex surface | First layer | $SiO_2$ | 80 |
| | Second layer | $ZrO_2$ | 29 |
| | Third layer | $SiO_2$ | 31 |
| | Fourth layer | $ZrO_2$ | 58 |
| | Fifth layer | $SiO_2$ | 92 |
| | | Water-repellent layer | — |

Furthermore, the light absorbing film and the water-repellent layer were formed on the concave surface (back surface) side of the base.

That is, the light absorbing film was formed, similarly to formation of the antireflection film, by adjusting conditions at the start of the film formation. When the film was formed, after oxygen ions were similarly applied, the following materials were formed into films under the following conditions. In the deposition of the light absorbing film, ions were not applied except for the initial oxygen ion application, and the light absorbing film was deposited without ion-assisting (non-Ion Assist Deposition).

As $SiO_2$, "$SiO_2$" available from Canon Optron Inc. was used, and was deposited at a film forming rate of 10.0 Å/s (angstrom per second). After the film formation, the refractive index (reference wavelength $\lambda=500$ nm) of the $SiO_2$ layer was 1.465.

As $ZrO_2$, "$ZrO_2$" available from Canon Optron Inc. was used, and was deposited at a film forming rate of 6.0 Å/s. After the film formation, the refractive index ($\lambda=500$ nm) of the $ZrO_2$ layer was 2.037.

As a $SiO_2+Al_2O_3$-mixture material corresponding to one of silica compounds, "S5F" available from Canon Optron Inc. was used, and was deposited at a film forming rate of 10.0 Å/s. After the film formation, the refractive index ($\lambda=500$ nm) of the $SiO_2+Al_2O_3$-mixture layer was 1.491. In general, in a $SiO_2+Al_2O_3$-mixture material, the weight of $SiO_2$ is greater than the weight of $Al_2O_3$, and, for example, a percentage of the weight of $Al_2O_3$ relative to the weight of $SiO_2$ is about several %. In the present invention, the percentage of the weight of $Al_2O_3$ to the weight of $SiO_2$ is not particularly limited, and the component of the silica compound is not limited to $SiO_2$ and $Al_2O_3$.

As $Al_2O_3$, "$Al_2O_3$" available from Canon Optron Inc. was used, and was deposited at a film forming rate of 10.0 Å/s. After the film formation, the refractive index ($\lambda=500$ nm) was 1.629.

As Ni for $NiO_x$ and Co for $CoO_x$, Ni and Co available from Kojundo Chemical Laboratory Co., Ltd. were used, and were each deposited at a film forming rate of 3.0 Å/s. At this deposition, oxygen gas was supplied at a flow rate of 10 sccm (standard cubic centimeter per minute), to form a $NiO_x$ layer or a $CoO_x$ layer. After the film formation, the refractive index ($\lambda=500$ nm) of the $NiO_x$ layer was 1.928, and the extinction coefficient was 2.134. The refractive index of the $NiO_x$ layer was about 2.00, and, therefore, was relatively high. Therefore, the $NiO_x$ layer was able to be used as a high refractive index layer. Furthermore, after the film formation, the refractive index ($\lambda=500$ nm) of the $CoO_x$ layer was very close to the refractive index of the $NiO_x$ layer.

The water-repellent layer was formed on the light absorbing film (air side) similarly to one on the antireflection film.

In examples 1 to 8 and comparative examples 1 to 7, only the structures of the light absorbing films were different from each other. Each of the structures is as indicated below in Tables 2 to 5.

TABLE 2

| | Example 1 | | Example 2 | | Example 3 | | Example 4 | |
|---|---|---|---|---|---|---|---|---|
| | Material and the like | Film thickness [nm] | Material and the like | Film thickness [nm] | Material and the like | Film thickness [nm] | Material and the like | Film thickness [nm] |
| — | base | — | base | — | base | — | base | — |
| — | HC film | — | HC film | — | HC film | — | HC film | — |
| 1 | $SiO_2$ | 40.0 | $SiO_2$ | 40.0 | $SiO_2$ | 70.0 | $Al_2O_3$ | 30.0 |
| 2 | $Al_2O_3$ | 40.0 | $Al_2O_3$ | 30.0 | $Al_2O_3$ | 30.0 | $NiO_x$ | 4.2 |
| 3 | $NiO_x$ | 4.4 | $NiO_x$ | 4.5 | $NiO_x$ | 4.2 | $SiO_2 + Al_2O_3$ | 35.0 |
| 4 | $SiO_2 + Al_2O_3$ | 30.0 | $Al_2O_3$ | 30.0 | $Al_2O_3$ | 45.0 | $NiO_x$ | 4.2 |
| 5 | $NiO_x$ | 4.4 | $NiO_x$ | 4.5 | $NiO_x$ | 4.2 | $SiO_2 + Al_2O_3$ | 60.0 |
| 6 | $SiO_2 + Al_2O_3$ | 70.0 | $SiO_2 + Al_2O_3$ | 75.0 | $SiO_2 + Al_2O_3$ | 80.0 | water-repellent layer | — |
| 7 | water-repellent layer | — | water-repellent layer | — | water-repellent layer | — | — | — |

TABLE 3

| | Comparative example 1 | | Comparative example 2 | | Comparative example 3 | | Comparative example 4 | |
|---|---|---|---|---|---|---|---|---|
| | Material and the like | Film thickness [nm] | Material and the like | Film thickness [nm] | Material and the like | Film thickness [nm] | Material and the like | Film thickness [nm] |
| — | base | — | base | — | base | — | base | — |
| — | HC film | — | HC film | — | HC film | — | HC film | — |
| 1 | $ZrO_2$ | 50.0 | $ZrO_2$ | 128.0 | $ZrO_2$ | 50.0 | $SiO_2$ | 30.0 |
| 2 | $SiO_2$ | 18.0 | $NiO_x$ | 4.0 | $SiO_2$ | 15.0 | $ZrO_2$ | 15.0 |
| 3 | $ZrO_2$ | 50.0 | $SiO_2 + Al_2O_3$ | 61.0 | $ZrO_2$ | 56.0 | $SiO_2 + Al_2O_3$ | 25.0 |
| 4 | $SiO_2 + Al_2O_3$ | 30.0 | $NiO_x$ | 4.0 | $NiO_x$ | 4.2 | $NiO_x$ | 4.6 |
| 5 | $NiO_x$ | 4.6 | $SiO_2 + Al_2O_3$ | 57.0 | $SiO_2 + Al_2O_3$ | 58.0 | $SiO_2 + Al_2O_3$ | 30.0 |
| 6 | $SiO_2 + Al_2O_3$ | 35.0 | water-repellent layer | — | $NiO_x$ | 4.6 | $NiO_x$ | 4.6 |

TABLE 3-continued

| | Comparative example 1 | | Comparative example 2 | | Comparative example 3 | | Comparative example 4 | |
|---|---|---|---|---|---|---|---|---|
| | Material and the like | Film thickness [nm] | Material and the like | Film thickness [nm] | Material and the like | Film thickness [nm] | Material and the like | Film thickness [nm] |
| 7 | $NiO_x$ | 4.6 | — | — | — | — | $SiO_2 + Al_2O_3$ | 53.0 | $SiO_2 + Al_2O_3$ | 65.0 |
| 8 | $SiO_2 + Al_2O_3$ | 55.0 | — | — | water-repellent layer | — | water-repellent layer | — |
| 9 | water-repellent layer | — | — | — | — | — | — | — |

TABLE 4

| | Comparative example 5 | | Comparative example 6 | | Comparative example 7 | | Example 5 | |
|---|---|---|---|---|---|---|---|---|
| | Material and the like | Film thickness [nm] | Material and the like | Film thickness [nm] | Material and the like | Film thickness [nm] | Material and the like | Film thickness [nm] |
| — | base | — | base | — | base | — | base | — |
| — | HC film | — | HC film | — | HC film | — | HC film | — |
| 1 | $ZrO_2$ | 120.0 | $SiO_2$ | 30.0 | $SiO_2 + Al_2O_3$ | 30.0 | $SiO_2$ | 30.0 |
| 2 | $SiO_2 + Al_2O_3$ | 25.0 | $ZrO_2$ | 28.0 | $ZrO_2$ | 28.0 | $ZrO_2$ | 50.0 |
| 3 | $NiO_x$ | 4.2 | $SiO_2$ | 32.0 | $SiO_2 + Al_2O_3$ | 32.0 | $SiO_2$ | 20.0 |
| 4 | $SiO_2 + Al_2O_3$ | 35.0 | $ZrO_2$ | 66.0 | $ZrO_2$ | 66.0 | $ZrO_2$ | 50.0 |
| 5 | $NiO_x$ | 4.2 | $SiO_2 + Al_2O_3$ | 94.0 | $SiO_2 + Al_2O_3$ | 94.0 | $NiO_x$ | 4.7 |
| 6 | $SiO_2 + Al_2O_3$ | 65.0 | $NiO_x$ | 7.5 | $NiO_x$ | 7.5 | $SiO_2 + Al_2O_3$ | 50.0 |
| 7 | water-repellent layer | — | $SiO_2 + Al_2O_3$ | 85.0 | $SiO_2 + Al_2O_3$ | 85.0 | $NiO_x$ | 4.7 |
| 8 | — | — | water-repellent layer | — | water-repellent layer | — | $SiO_2 + Al_2O_3$ | 50.0 |
| 9 | — | — | — | — | — | — | water-repellent layer | — |

TABLE 5

| | Example 6 | | Example 7 | | Example 8 | |
|---|---|---|---|---|---|---|
| | Material and the like | Film thickness [nm] | Material and the like | Film thickness [nm] | Material and the like | Film thickness [nm] |
| — | base | — | base | — | base | — |
| — | HC film | — | HC film | — | HC film | — |
| 1 | $Al_2O_3$ | 30.0 | $Al_2O_3$ | 40.0 | $Al_2O_3$ | 30.0 |
| 2 | $CoO_{x'}$ | 4.5 | $NiO_x$ | 4.2 | $CoO_{x'}$ | 4.5 |
| 3 | $SiO_2 + Al_2O_3$ | 35.0 | $SiO_2 + Al_2O_3$ | 50.0 | $SiO_2 + Al_2O_3$ | 35.0 |
| 4 | $CoO_{x'}$ | 4.5 | $NiO_x$ | 5.2 | $NiO_x$ | 4.2 |
| 5 | $SiO_2 + Al_2O_3$ | 60.0 | $SiO_2 + Al_2O_3$ | 40.0 | $SiO_2 + Al_2O_3$ | 60.0 |
| 6 | water-repellent layer | — | $NiO_x$ | 5.2 | water-repellent layer | — |
| 7 | — | — | $SiO_2 + Al_2O_3$ | 65.0 | — | — |
| 8 | — | — | water-repellent layer | — | — | — |

Whether or not ion-assisting was performed and the result of a test for the density (water vapor permeability closely associated with the density) of the deposited film, for the $SiO_2$ film and the $Al_2O_3$ film, are indicated below in Table 6. The column labeled "No." in Table 6 describes the order starting from the highest water vapor permeability.

In this test, a PET (polyethylene terephthalate) film was a base. A water vapor permeability (gram per cubic meter for one day, $g/m^2 \cdot day$) was measured for a case where only a base was used, and for a case where a $SiO_2$ film, an $Al_2O_3$ film, or a $SiO_2+Al_2O_3$-mixture film was deposited on the base by changing between use of ion-assisting and non-use thereof.

In the case where only the base was used, the water vapor permeability was 7.29.

Meanwhile, in the case where the $SiO_2$ film, the $Al_2O_3$ film, or the $SiO_2+Al_2O_3$-mixture film (deposition materials are described in the column for "material" in Table 6) was deposited without ion-assisting such that the film thicknesses were 90.3 nm, 94.8 nm, 74.4 nm, the water vapor permeabilities were 6.75, 6.28, 6.12, and were slightly lower than that in the case where only the base was used. This is because the $SiO_2$ film, the $Al_2O_3$ film, or the $SiO_2+Al_2O_3$-mixture film prevented permeation of water vapor.

Furthermore, in the case where the $SiO_2$ film was deposited by ion-assisting (acceleration voltage of 900 volts (V), acceleration current of 900 milliampere (mA), bias current of 600 mA, and introduced oxygen ($O_2$) gas at 50 sccm, by means of an ion gun) such that the film thickness was 69.1 nm, the water vapor permeability was 3.77 and was thus more greatly reduced. This is because the density of the $SiO_2$ film formed by ion-assisted deposition was greater than the density in the case of ion-assisting being not performed, and the $SiO_2$ film having such a great density further prevented permeation of water vapor.

Similarly, in the case where the $Al_2O_3$ film was deposited by ion-assisting (acceleration voltage of 1000 V, acceleration current of 1000 mA, bias current of 600 mA, and introduced oxygen gas at 50 sccm) such that the film thickness was 79.0 nm, the water vapor permeability was 0.89 and was thus greatly reduced. This is because the density of the $Al_2O_3$ film formed by ion-assisted deposition was greater than the density in the case of ion-assisting being not performed, and the $Al_2O_3$ film having such a great density further prevented permeation of water vapor.

Figure 1:
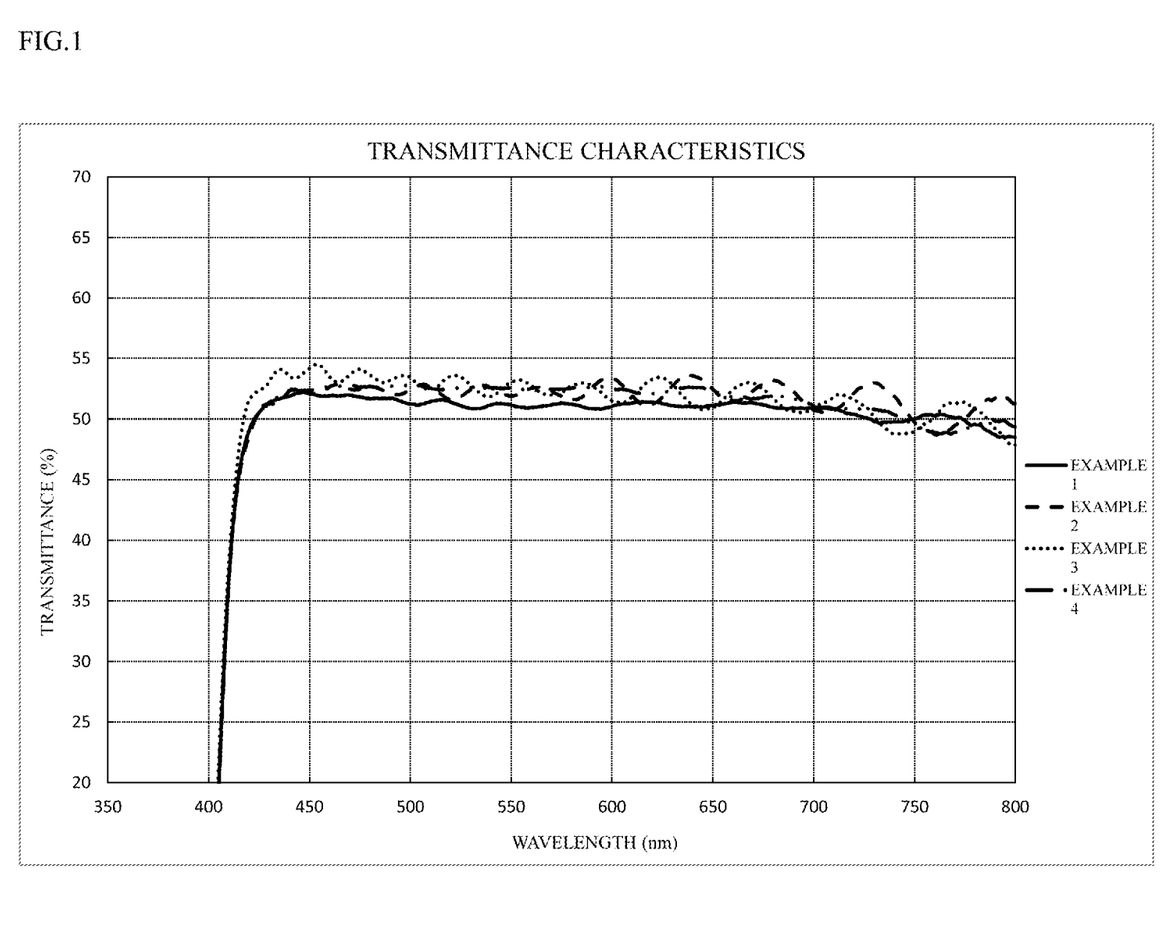
FIG. 1 shows a graph representing a spectral transmittance distribution in a visible region according to examples 1 to 4 of the present invention.

Furthermore, in the case where the $SiO_2+Al_2O_3$-mixture film was similarly deposited by performing ion-assisting similar to the $SiO_2$ film such that the film thickness was 75.0 nm, the water vapor permeability was 1.61 and was thus low. This is because the density of the $SiO_2+Al_2O_3$-mixture film formed by ion-assisted deposition was greater than the density in the case of ion-assisting being not performed, and the $SiO_2+Al_2O_3$-mixture film having such a great density further prevented permeation of water vapor.

shaped region and visible light was uniformly absorbed at an absorption rate of about 50%. In each of examples 1 to 4, the ND filter, for spectacles, prevented a color recognized during wearing from being greatly different from a color by naked eyes while having gray outer appearance. The absorption rate in the uniform absorption can be variously changed. Table 7 indicates values of L, a, and b in Lab color space (UCS space) according to examples 1 to 8 as follows. These values were measured by using a D65 light source at a viewing angle of 2°.

Figure 2:
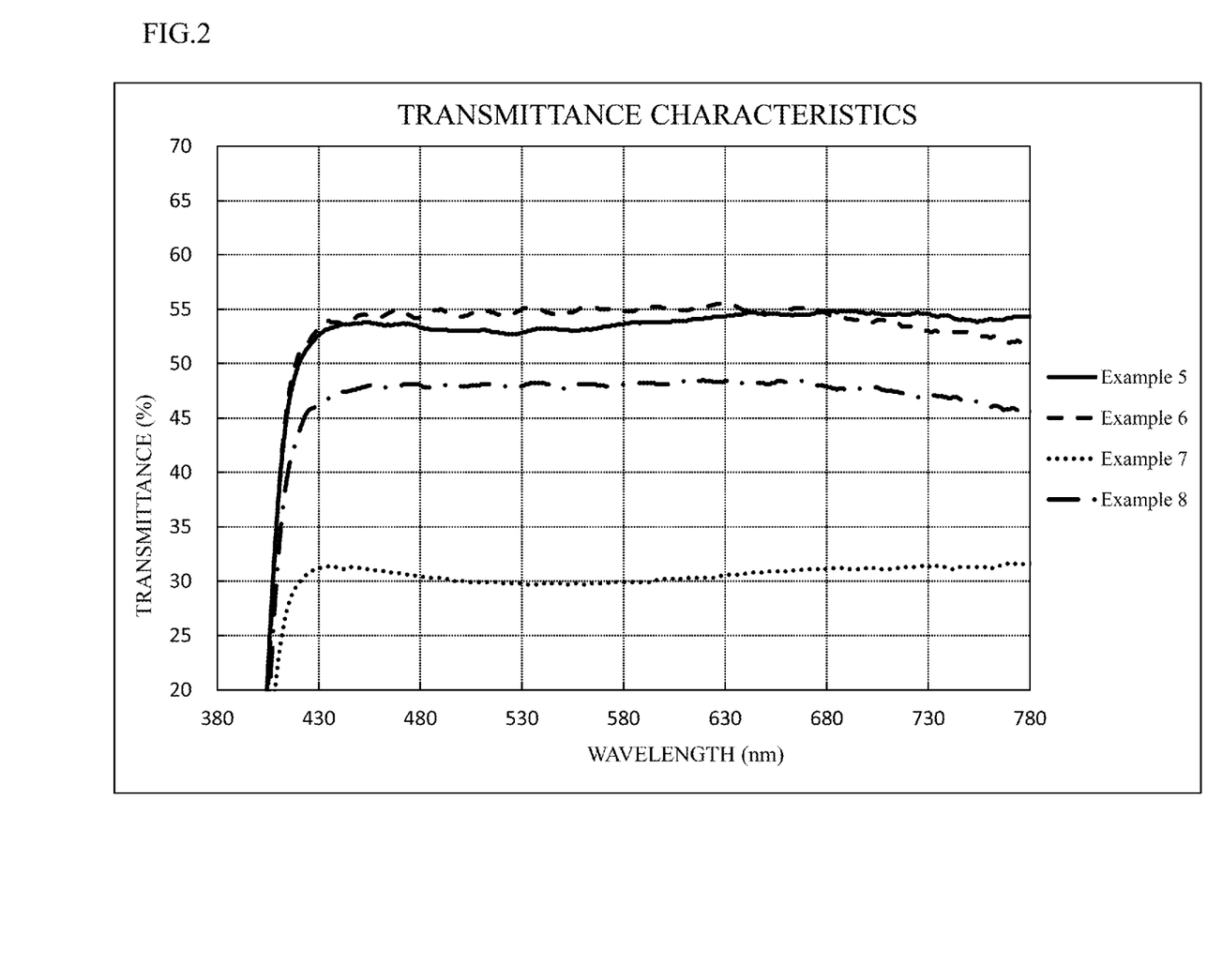
FIG. 2 shows a graph representing a spectral transmittance distribution in a visible region according to examples 5 to 8 of the present invention.

FIG. 2 shows a graph representing a spectral transmittance distribution in a visible region according to examples 5 to 8.

Example 5 ($NiO_x$ layer) and example 6 ($CoO_{x'}$ layer) each indicated a spectral transmittance distribution similar to those of examples 1 to 4 and had values of L, a, and b similar to those of examples 1 to 4. That is, in examples 5 and 6, the transmittance in a visible region was 54±3% so as to be within a band-shaped region and visible light was uniformly absorbed at an absorption rate of about 46%. In examples 5 and 6, the ND filter, for spectacles, prevented a color recognized during wearing from being greatly different from a color by naked eyes while having gray outer appearance. Furthermore, comparison between examples 5 and 6 indicates that the $NiO_x$ layer and the $CoO_{x'}$ layer have similar characteristics and can be similarly used.

In example 7, the number of the light absorbing layers ($NiO_x$ layers) was increased to three although the number thereof in each of examples 1 to 5 was two. Therefore, the absorption rate of visible light was higher than those of examples 1 to 5. In example 7, the transmittance in a visible region was 31±2% so as to be within a band-shaped region and visible light was uniformly absorbed at an absorption rate of about 70%. In example 7, the ND filter, for spectacles, prevented a color recognized during wearing from being greatly different from a color by naked eyes while having gray outer appearance. Example 7 indicated values of a and b which were similar to those of examples 1 to 6, and the L value which was reduced as compared to examples 1 to 6.

TABLE 6

| | | | | | Ion gun state | | | |
| --- | --- | --- | --- | --- | --- | --- | --- | --- |
| No. | Water vapor permeability [g/m² · day] | Material | Ion-assisted process | Film thickness [nm] | Acceleration voltage [V] | Acceleration current [mA] | Bias current [mA] | Introduced gas $O_2$ [sccm] |
| 1 | 7.29 | Only PET film | — | — | — | — | — | — |
| 2 | 6.75 | $SiO_2$ | Not performed | 90.3 | — | — | — | — |
| 3 | 6.28 | $Al_2O_3$ | Not performed | 94.8 | — | — | — | — |
| 4 | 6.12 | $SiO_2 + Al_2O_3$ | Not performed | 74.4 | — | — | — | — |
| 5 | 3.77 | $SiO_2$ | performed | 69.1 | 900 | 900 | 600 | 50 |
| 7 | 0.89 | $Al_2O_3$ | performed | 79.0 | 1000 | 1000 | 600 | 50 |
| 6 | 1.61 | $SiO_2 + Al_2O_3$ | performed | 75.0 | 900 | 900 | 600 | 50 |

FIG. 1 shows a graph representing a spectral transmittance distribution in a visible region according to examples 1 to 4.

The spectral transmittance distribution was measured by using a spectrophotometer (U-4100 manufactured by Hitachi High-Technologies Corporation).

In each of examples 1 to 4 ($NiO_x$ layers), the transmittance in a visible region was 51±3% so as to be within a band- In example 8, as the light absorbing layer, both the $NiO_x$ layer and the $CoO_{x'}$ layer were used. In example 8, the transmittance in a visible region was 47±2% so as to be within a band-shaped region and visible light was uniformly absorbed at an absorption rate of about 53%. In example 8, the ND filter, for spectacles, prevented a color recognized during wearing from being greatly different from a color by naked eyes while having gray outer appearance. Example 8 indicated values of a and b which were similar to those of examples 1 to 6, and the L value which was slightly reduced as compared to examples 1 to 6.

Figure 3:
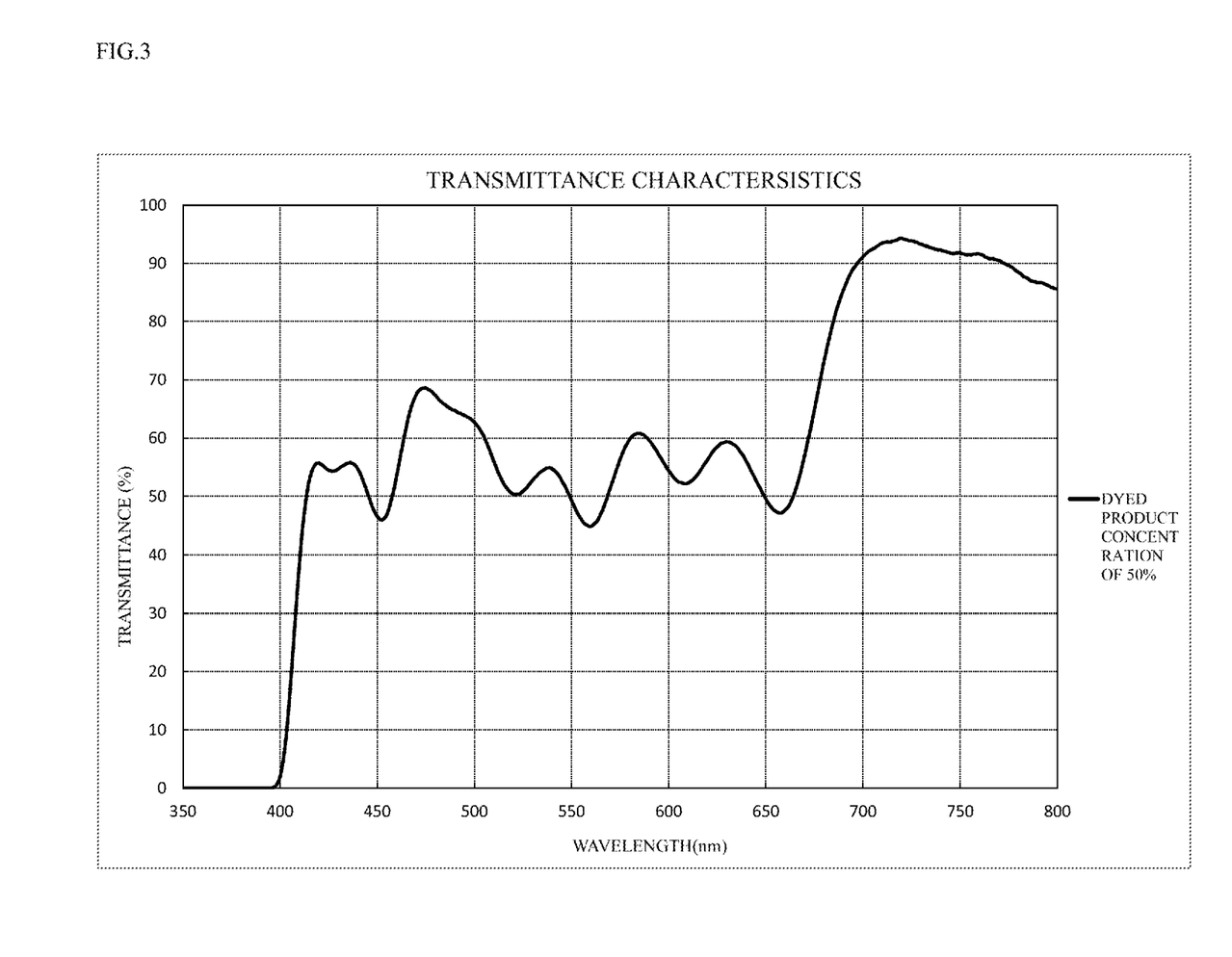
FIG. 3 shows a graph representing a spectral transmittance distribution for a commercially available dyed spectacles lens.

FIG. 3 shows a graph representing a spectral transmittance distribution for a dyed spectacles lens which is commercially available as gray sunglasses (concentration of 50%). The dyed spectacles lens had gray color similar to examples 1 to 8, and a lot of extreme values in a range of 45% to 94% were indicated in the spectral transmittance distribution in a visible region. Color during wearing was greatly different from color by naked eyes.

TABLE 7

|  |  | Example 1 | Example 2 | Example 3 | Example 4 |
|---|---|---|---|---|---|
| Lab space | L | 73.56 | 72.31 | 72.52 | 72.45 |
|  | a | −4.34 | −4.24 | −4.29 | −4.49 |
|  | b | 2.76 | 4.61 | 3.62 | 4.67 |
|  |  | Example 5 | Example 6 | Example 7 | Example 8 |
| Lab space | L | 73.04 | 71.97 | 54.73 | 69.31 |
|  | a | −3.48 | −4.21 | −2.18 | −4.17 |
|  | b | 4.57 | 5.58 | 2.28 | 4.87 |

Figure 4:
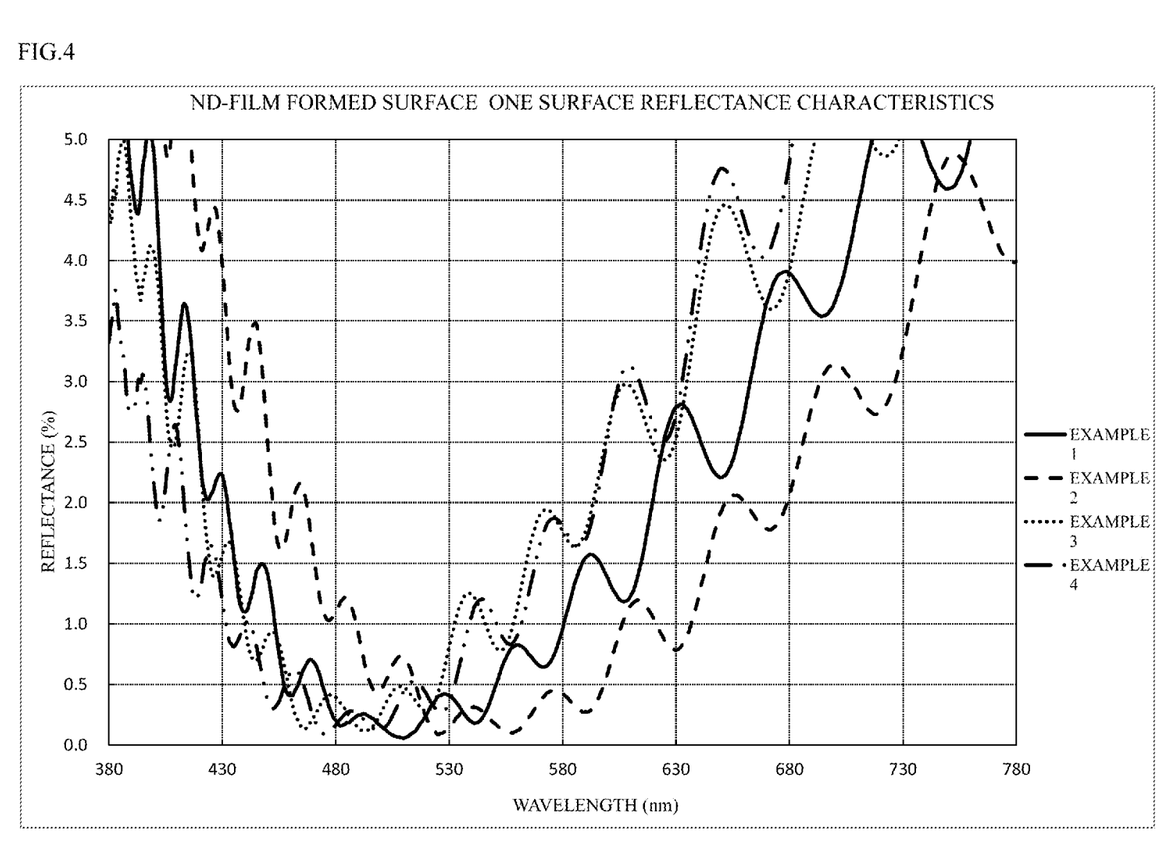
FIG. 4 shows a graph representing a spectral reflectance distribution (one surface) in a visible region on a concave surface (ND-film formed surface) side according to examples 1 to 4.

FIG. 4 shows a graph representing a spectral reflectance distribution (one surface) in a visible region on the concave surface (ND-film formed surface) side according to examples 1 to 4.

A spectral reflectance distribution was measured by a reflectometer (USPM-RU manufactured by Olympus Corporation).

In examples 1 to 4, the reflectance was approximately not greater than 5% in the visible region on the concave surface side, and a minimum value (minimal value in an overall distribution) in the reflectance distribution was in a green color region (not less than about 450 nm and not greater than about 580 nm) that was greatly associated with visibility. Therefore, each light absorbing film functions also as an antireflection film.

Figure 5:
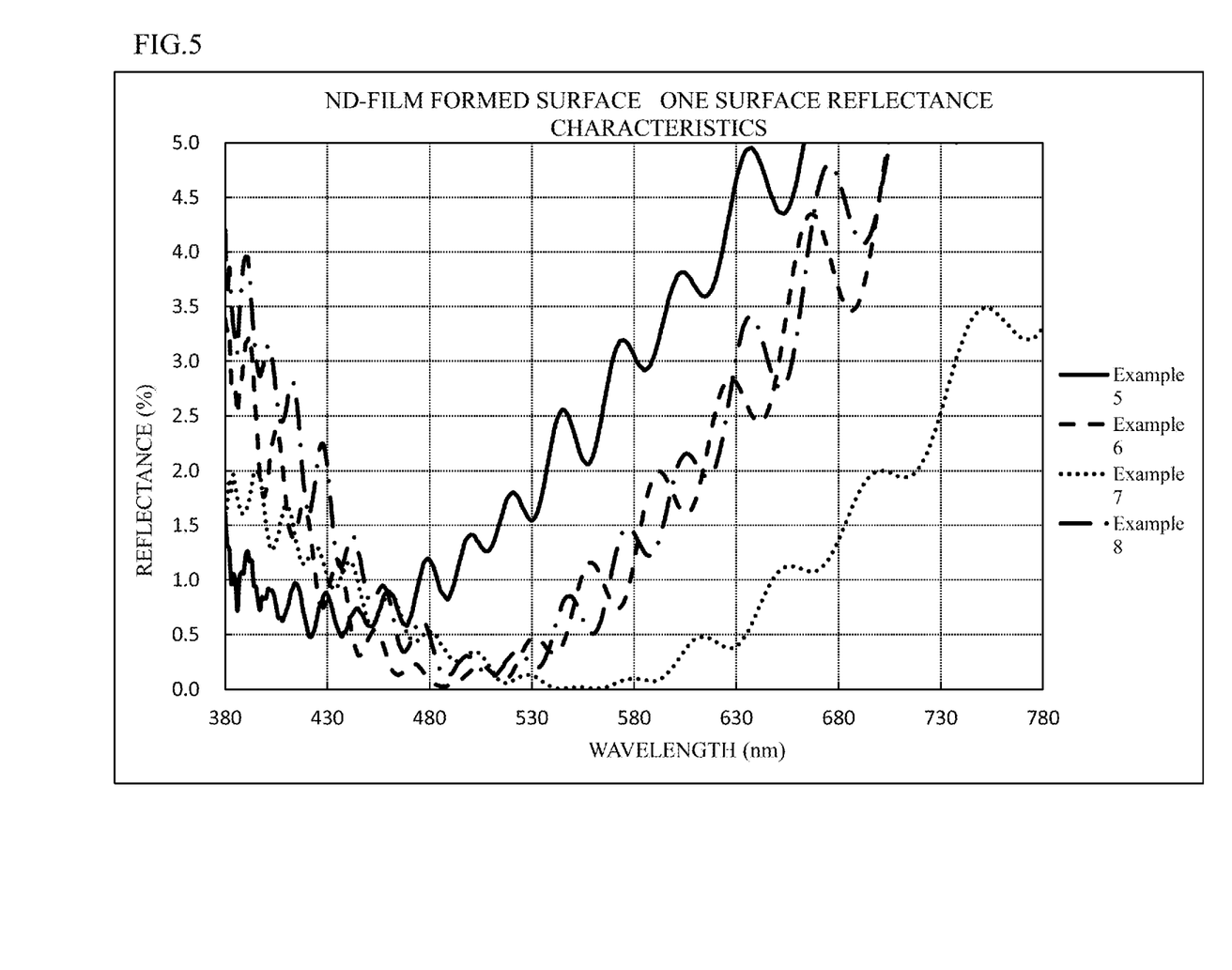
FIG. 5 shows a graph representing a spectral reflectance distribution (one surface) in a visible region on a concave surface (ND-film formed surface) side according to examples 5 to 8.

FIG. 5 shows a graph, similar to that in FIG. 4, for the concave surface (ND-film formed surface) side according to examples 5 to 8.

Further, in examples 5 to 8, the reflectance was approximately not greater than 5% in a visible region on the concave surface side, and a minimum value (minimal value in the overall distribution) in the reflectance distribution was in a green color region which was greatly associated with visibility, and a region adjacent thereto (not less than about 440 nm and not greater than about 580 nm). Therefore, each light absorbing film functions also as an antireflection film.

Figure 6:
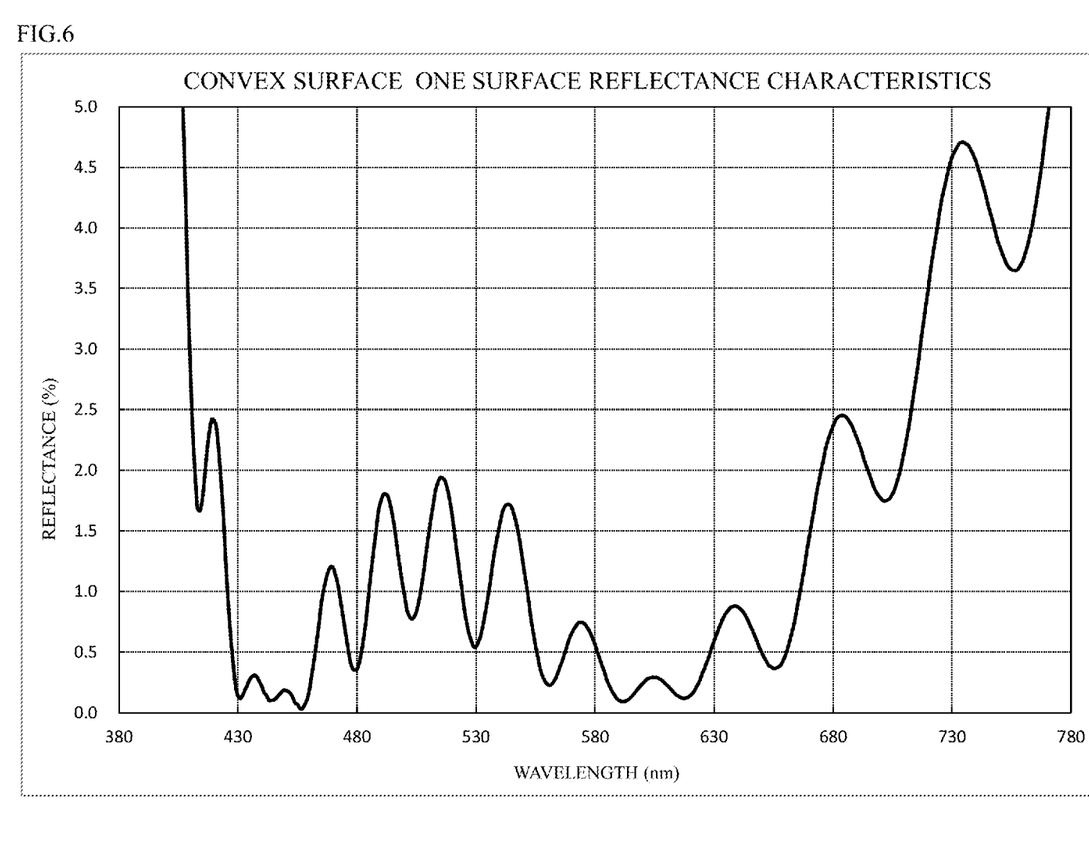
FIG. 6 shows a graph representing a spectral reflectance distribution (one surface, common) in a visible region on a convex surface side according to examples 1 to 8.

FIG. 6 shows a graph representing a similarly measured spectral reflectance distribution (one surface, common) in a visible region on the convex surface side according to examples 1 to 8.

In examples 1 to 8, the reflectance was approximately not greater than 5% in a visible region also on the convex surface side. In a region of not less than 430 nm and not greater than 670 nm corresponding to the most of the visible region, the reflectance was not greater than 2%. Thus, reflection of the visible light was sufficiently prevented on the convex surface side.

In examples 1 to 8, the function (uniform absorption) as the ND filter was sufficiently exhibited on only the concave surface side where the light absorbing film was disposed. Therefore, an antireflection film structured so as to have an improved antireflection function can be disposed on the convex surface side.

In Tables 8 to 11 indicated below, results of various tests for durability, that is, a constant temperature and humidity test, a weather-resistance and adhesion test for the concave surface, and a salt water boiling test are indicated for examples 1 to 8 and comparative examples 1 to 7.

In the constant temperature and humidity test, a constant temperature and humidity tester (LHU-113 manufactured by ESPEC CORP.) was used, and each ND filter was put in the tester in the environment of 60° C. and 95%. After elapse of one day, three days, and seven days from the start of the putting, the ND filter was temporarily taken out, and whether or not abnormality of an outer appearance such as expansion, color change, or crack occurred was observed.

In the weather-resistance and adhesion test for the concave surface (light-absorbing-film formed surface), each concave surface was cut by a cutter so as to form 100 cells thereon in total, and a cellophane tape was adhered over the entirety of the cells, and forcefully removed. This was repeated five times in total, and the number of cells which were not removed thereinside was checked after completion of the total five time removals and during the five time removals (the number of cells which were not removed initially after completion of the total five time removals/the number of cells which were not removed during the five time removals). Furthermore, the ND filter was put into a sunshine weather meter (580B manufactured by Suga Test Instruments Co., Ltd.), and was taken out when the putting time reached 60 hours (hr), and the cells were formed as described above, cellophane tape removal was performed five times, and the number of cells was checked. Furthermore, the ND filter was similarly put, and, also when the putting time reached total 120 hours, total 180 hours, and total 240 hours, the cells were formed as described above, cellophane tape removal was performed five times, and the number of cells was checked.

In the salt water boiling test, 45 g of sodium chloride and 1000 g of pure water were mixed, to form salt water. The salt water was boiled by using a heater. Each ND filter was soaked in the boiled salt water, and, after the total soaking time reached 10 minutes, 20 minutes, 30 minutes, and 40 minutes, the ND filter was taken out and the outer appearance was observed similarly to the constant temperature and humidity test.

TABLE 8

|  |  | Example 1 | Example 2 | Example 3 | Example 4 |
|---|---|---|---|---|---|
| Constant | One day | no change | no change | no change | no change |
| temperature | Three days | no change | no change | no change | no change |
| and humidity | Seven days | no change | no change | no change | no change |
| Weather- | Initially | 100/100 | 100/100 | 100/100 | 100/100 |
| resistance | 60 hr | 100/100 | 100/100 | 100/100 | 100/100 |
| and adhesion | 120 hr | 100/100 | 100/100 | 100/100 | 100/100 |
| (ND processed | 180 hr | 100/100 | 100/100 | 100/100 | 100/100 |
| surface) | 240 hr | 100/100 | 100/100 | 100/100 | 100/100 |

TABLE 8-continued

|  |  | Example 1 | Example 2 | Example 3 | Example 4 |
|---|---|---|---|---|---|
| Salt water boiling | 10 min. | not removed | not removed | not removed | not removed |
|  | 20 min. | not removed | not removed | not removed | not removed |
|  | 30 min. | not removed | not removed | not removed | not removed |
|  | 40 min. | not removed | not removed | not removed | not removed |

TABLE 9

|  |  | Comparative example 1 | Comparative example 2 | Comparative example 3 | Comparative example 4 |
|---|---|---|---|---|---|
| Constant temperature and humidity | One day | color change in center portion | very light stain in end portion | linearly shaped color change | crack in center portion |
|  | Three days | crack | very light stain in end portion | linearly shaped color change | crack in center portion |
|  | Seven days | crack | stain in end portion + linearly shaped color change | a lot of linearly shaped color changes in center portion | crack in center portion |
| Weather-resistance and adhesion (ND processed surface) | Initially | 100/100 | 100/100 | 100/100 | 98/99 |
|  | 60 hr | 100/100 | 100/100 | 100/100 | 10/80 |
|  | 120 hr | 99.5/100 | 100/100 | 100/100 | — |
|  | 180 hr | 99.5/100 | 100/100 | 100/100 | — |
|  | 240 hr | 100/100 | 100/100 | 100/100 | — |
| Salt water boiling | 10 min. | not removed | not removed | not removed | not removed |
|  | 20 min. | not removed | not removed | not removed | not removed |
|  | 30 min. | not removed | not removed | not removed | not removed |
|  | 40 min. | not removed | not removed | not removed | not removed |

TABLE 10

|  |  | Comparative example 5 | Comparative example 6 | Comparative example 7 | Example 5 |
|---|---|---|---|---|---|
| Constant temperature and humidity | One day | no change | crescent-shaped color change | crescent-shaped color change | no change |
|  | Three days | no change | crescent-shaped color change | crescent-shaped color change | no change |
|  | Seven days | no change | crescent-shaped color change | crescent-shaped color change | color change in peripheral portion + crack |
| Weather-resistance and adhesion (ND processed surface) | Initially | 100/100 | 100/100 | 100/100 | 100/100 |
|  | 60 hr | 10/70 | 100/100 | 100/100 | 100/100 |
|  | 120 hr | — | 100/100 | 100/100 | 100/100 |
|  | 180 hr | — | 100/100 | 100/100 | 100/100 |
|  | 240 hr | — | 100/100 | 100/100 | 100/100 |
| Salt water boiling | 10 min. | not removed | not removed | not removed | not removed |
|  | 20 min. | not removed | not removed | not removed | not removed |
|  | 30 min. | not removed | not removed | not removed | not removed |
|  | 40 min. | not removed | not removed | not removed | not removed |

TABLE 11

|  |  | Example 6 | Example 7 | Example 8 |
|---|---|---|---|---|
| Constant temperature and humidity | One day | no change | no change | no change |
|  | Three days | no change | no change | no change |
|  | Seven days | no change | no change | no change |
| Weather-resistance and adhesion (ND processed surface) | Initially | 100/100 | 100/100 | 100/100 |
|  | 60 hr | 100/100 | 100/100 | 100/100 |
|  | 120 hr | 100/100 | 100/100 | 100/100 |
|  | 180 hr | 100/100 | 100/100 | 100/100 |
|  | 240 hr | 100/100 | 100/100 | 100/100 |
| Salt water boiling | 10 min. | not removed | not removed | not removed |
|  | 20 min. | not removed | not removed | not removed |
|  | 30 min. | not removed | not removed | not removed |
|  | 40 min. | not removed | not removed | not removed |

In each of examples 1 to 8 and comparative examples 1 to 7, in the salt water boiling test, abnormality in outer appearance including removal was not observed.

Furthermore, in examples 1 to 8, in the constant temperature and humidity test, even after elapse of seven days, abnormality in outer appearance was not observed (no change). However, in example 5, although abnormality in outer appearance was not confirmed when three days had elapsed, color change in the peripheral portion and occurrence of crack were confirmed after elapse of seven days.

Furthermore, in examples 1 to 8, in the weather-resistance and adhesion test, removal was not confirmed in all the cells (100/100).

In comparative example 1, in the weather-resistance and adhesion test, partial removal in one cell was confirmed after completion of the total five time removals when 120 hours had elapsed and 180 hours had elapsed (99.5/100). However, another removal was not confirmed, and this indicates a good weather resistance.

However, in the constant temperature and humidity test, after one day had elapsed, color change in the center portion was confirmed. After, three days had elapsed, occurrence of crack was confirmed.

Color change was confirmed in the $NiO_x$ layer, and it is considered that this was caused by action of moisture according to the color change state. Crack in the concave surface is considered to occur in accordance with a state of balance of stress in the light absorbing films.

In comparative example 1, the first layer from the base side (the same applies to the following description) was not a $SiO_2$ layer or an $Al_2O_3$ layer, but a $ZrO_2$ layer. It is considered that the $ZrO_2$ layer had too small film density and was likely to allow water vapor to permeate as compared to the $SiO_2$ layer and the $Al_2O_3$ layer. Thus, moisture from the plastic base soon reached the second layer and the subsequent layers, in particular, the $NiO_x$ layer, which caused color change.

From the standpoint of improving a film density of the first layer, in examples 1 to 8, it can be assumed that ion-assisted deposition is performed for the first layer to enhance the density. However, when the ion-assisting is performed, the density becomes excessively high, and little water vapor permeates (see Table 6) and the moisture of the base cannot be released on the concave surface, and the moisture is accumulated. When an amount of the accumulated moisture exceeds a limit value, the moisture passes through weak points of the light absorbing film (first layer) such that spots appear in outer appearance, which causes a failure. Meanwhile, in the case of ion-assisting being not performed, such moisture accumulation or generation of such spots in outer appearance do not occur and an appropriate density can be obtained. Therefore, the first layer preferably has a density as obtained without ion-assisting.

In comparative example 1, the adjacent layer, on the base side, of each of the two $NiO_x$ layers and the adjacent layer thereof on the opposite side were each the $SiO_2+Al_2O_3$-mixture layer. The $SiO_2+Al_2O_3$-mixture layer has a higher density than the $SiO_2$ layer and the $Al_2O_3$ layer, and moisture is less likely to permeate (the structure is dense and has a high packing effect). This may be because $SiO_2$ is cross-linked by $Al_2O_3$.

The stress of the $SiO_2+Al_2O_3$-mixture layer is different from the stress of the NiO layer, and a difference between the stress of the $NiO_x$ layer and the stress of the $SiO_2+Al_2O_3$-mixture layer is relatively great. Therefore, when both adjacent layers of the $NiO_x$ layer are the $SiO_2+Al_2O_3$-mixture layers, balance in stress in the light absorbing films is relatively not good. Therefore, crack is considered to have occurred in the constant temperature and humidity test.

Meanwhile, as in examples 1 to 5 and 7, the adjacent layer, on the base side, of at least one of the $NiO_x$ layers and the adjacent layer thereof on the opposite side are formed from different materials, respectively. Thus, stress is released from the layer formed from the different material to reduce the entire stress, thereby preventing occurrence of crack. For example, in example 1, the $Al_2O_3$ layer which was the second layer and was the adjacent layer, on the base side, of the $NiO_x$ layer in the third layer was formed from a material different from the $SiO_2+Al_2O_3$-mixture layer which was the fourth layer and was the adjacent layer thereof on the opposite side. Therefore, stress was able to be released from the adjacent layer on the base side. Although each of the adjacent layer (fourth layer), on the base side, of the $NiO_x$ layer in the fifth layer and the adjacent layer (sixth layer) thereof on the opposite side was the $SiO_2+Al_2O_3$-mixture layer, stress was able to be reduced by the $Al_2O_3$ layer in the second layer. In example 2, the $SiO_2+Al_2O_3$-mixture layer that was the sixth layer and was the adjacent layer, on the opposite side, of the $NiO_x$ layer in the fifth layer was formed from a material different from the $Al_2O_3$ layer that was the fourth layer and was the adjacent layer thereof on the base side. Therefore, stress was able to be released from the adjacent layer on the opposite side.

Further, in the $CoO_{x'}$ layers in example 6 and at least one of the $NiO_x$ layer and the $CoO_{x'}$ layer in example 8, the adjacent layer thereof on the base side and the adjacent layer thereof on the opposite side are formed from different materials, respectively. Therefore, stress is reduced in at least one light absorbing layer, and occurrence of crack is prevented, similarly to the $NiO_x$ layer in examples 1 to 5, and 7.

The packing effect and difference in stress in the $SiO_2+Al_2O_3$-mixture layer tends to be the same also for another silica compound.

In comparative example 2, in the weather-resistance and adhesion test, removal was not confirmed at any time, and weather resistance was good.

However, in the constant temperature and humidity test, a very light stain (color change) was confirmed in the peripheral portion (end portion) after elapse of one day, and it was confirmed that the stain in the end portion had become deep and linearly-shaped color-change had occurred after elapse of seven days.

In comparative example 2, the $ZrO_2$ layer in the first layer allowed more moisture to permeate than the $SiO_2$ layer or the $Al_2O_3$ layer allowed. Therefore, it is considered that moisture released from the base formed from plastic reached the $NiO_x$ layer in the second layer in the peripheral portion, and the $NiO_x$ layer was changed in its state.

Meanwhile, in examples 1 to 8, the first layer of the light absorbing film was the $SiO_2$ layer or the $Al_2O_3$ layer, and allowed less moisture permeation as compared to the $ZrO_2$ layer, and the $NiO_x$ layer was prevented from being changed in its state due to moisture. In examples 1 to 8, the $SiO_2$ layer or the $Al_2O_3$ layer in the first layer had a density as obtained by deposition without ion-assisting, and color change such as spots in outer appearance was reduced. Thus, examples 1 to 8 are more preferable.

In comparative example 3, in the weather-resistance and adhesion test, removal was not confirmed at any time, and weather resistance was good.

However, in the constant temperature and humidity test, it was confirmed that linearly shaped color change occurred over the entirety after elapse of one day. Further, a color-changed portion was increased in the center portion after elapse of seven days. In comparative example 3, the light absorbing film was structured such that the $SiO_2$ layer and the $ZrO_2$ layer were added between the first layer and the second layer in comparative example 2, and the film thickness of the $ZrO_2$ layer in the first layer was reduced according thereto, that is, the first layer in comparative example 2 was divided into three layers. However, the test result did not show improvement as compared to comparative example 2. Therefore, it is considered that, even if the first layer is divided, influence of permeation of moisture into the $NiO_x$ layer may not be prevented as long as the first layer is the $ZrO_2$ layer.

In comparative example 4, in the weather-resistance and adhesion test, a cell was removed even in the initial stage.

The removals continuously occurred until the completion of the total five time removals after elapse of 60 hours, and eventually only 10 non-removal cells were left. Thus, the subsequent test was stopped.

In the constant temperature and humidity test, crack was confirmed in the center portion after elapse of one day.

Thus, in comparative example 4, weather resistance, heat resistance, and moisture resistance were poor. This may be because comparative example 4 had, similarly to comparative example 1, a structure in which each of the $NiO_x$ layers was disposed between the $SiO_2+Al_2O_3$-mixture layers, and balance in stress continued to be lost.

In comparative example 4, color change did not occur, and it is considered that moisture can be prevented from reaching the $NiO_x$ layer when the $SiO_2$ layer is the first layer. Meanwhile, in comparative example 3, while the $SiO_2$ layer was disposed in the second layer, the first layer was the $ZrO_2$ layer. Therefore, moisture was not able to be prevented from reaching the $NiO_x$ layer.

In comparative example 5, in the constant temperature and humidity test, abnormal outer appearance was not observed even after elapse of seven days.

However, in the weather-resistance and adhesion test, a lot of removals were confirmed in 60 hours.

In comparative example 5, it is considered that the first layer was the $ZrO_2$ layer, and more moisture permeated. Further, each of the $NiO_x$ layers in the third layer and the fifth layer was disposed between the $SiO_2+Al_2O_3$-mixture layers similarly to comparative example 1, and weather resistance was influenced.

In comparative example 6, in the weather-resistance and adhesion test, removal was not confirmed at any time, and weather resistance was good.

However, in the constant temperature and humidity test, crescent-shaped color change was observed in the end portion after elapse of one day.

In the end portion of the concave surface of the base, a direction in which the $NiO_x$ (deposition material) is applied is not perpendicular to the tangent line of the surface of the base when the deposition is performed, and is tilted from the perpendicular line at an angle. Therefore, it is considered that the density of $NiO_x$ in the $NiO_x$ layer is relatively small in the end portion as compared to a portion (center portion) in which the direction in which $NiO_x$ is applied to the base is perpendicular. When the density of $NiO_x$ is thus small, the $NiO_x$ layer becomes porous according thereto. When the cross-sectional area of the hole portions in the porous $NiO_x$ layer is not less than a threshold value, moisture enters through the hole portions, and the $NiO_x$ layer changes in its state. In comparative example 6, it is considered that the film thickness of the $NiO_x$ layer was 7.5 nm in order to absorb visible light, the porosity in the end portion became relatively significant, the $NiO_x$ layer was changed in its state due to moisture mainly from air side, and the color change occurred.

In examples 1 to 5, 7, and 8, the film thickness of the $NiO_x$ layer was not less than 4.2 nm and not greater than 4.7 nm, and influence of porosity (porous state) in the end portion was alleviated. Furthermore, when the film thickness of the $NiO_x$ layer is thin, difference in stress relative to the adjacent layer is reduced according thereto. Further, in the $CoO_{x'}$ layer of examples 6 and 8, similarly, the film thickness was not greater than 4.5 nm, and influence of porosity in the end portion was also alleviated. According to examples 1 to 8 and comparative examples 1 to 7, and a result of simulation, it is proved that an effect of alleviating porosity and difference in stress is well exhibited when the film thickness of the $NiO_x$ layer or the $CoO_{x'}$ layer is not greater than 6 nm. In a case where absorption of visible light becomes insufficient by the thickness of the $NiO_x$ layer or the $CoO_{x'}$ layer being reduced, a plurality of layers (not greater than 6 nm) may be formed (division of the light absorbing layer).

In comparative example 7, as in comparative example 6, crescent-shaped color change was confirmed after elapse of one day.

In comparative example 7, the film thickness of the $NiO_x$ layer (sixth layer) was relatively great, and, further, the adjacent layer (fifth layer), on the base side, of the $NiO_x$ layer and the adjacent layer (seventh layer) thereof on the opposite side were each the $SiO_2+Al_2O_3$-mixture layer, and it is considered that, in particular, the end portion was influenced by difference in stress and porosity.

As described above, as in examples 1 to 8, when the adjacent layer, on the base side, of at least one light absorbing layer (at least one of the $NiO_x$ layer and the $CoO_{x'}$ layer, and, in a case where the number of the layers is plural, at least one of the layers) and the adjacent layer thereof on the opposite side are formed from different materials, respectively, a ND filter that has a base formed from plastic and excellent durability can be provided.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A neutral density filter with a plastic base, the neutral density filter comprising:
    a base formed from plastic; and
    a light absorbing film disposed on at least one surface of the base, the light absorbing film having a plurality of layers, wherein
    the light absorbing film includes a first layer from a base side that is a $SiO_2$ layer formed from $SiO_2$ or an $Al_2O_3$ layer formed from $Al_2O_3$,
    the light absorbing film includes at least one of one or more $NiO_x$ layers formed from $NiO_x$ where x is not less than 0 and not greater than 1 and one or more $CoO_{x'}$ layers formed from $CoO_{x'}$ where x' is not less than 0 and not greater than 1.5, and
    the at least one of the $NiO_x$ layers and the $CoO_{x'}$ layers is disposed between a base-side adjacent layer which is adjacent to the at least one layer on the base side, and an opposite-side adjacent layer which is formed from a material different from the base-side adjacent layer and which is adjacent to the at least one layer on an opposite side.

2. The neutral density filter with the plastic base, according to claim 1, wherein the $NiO_x$ layers and the $CoO_{x'}$ layers each have a physical film thickness that is not greater than 6 nanometers.

3. The neutral density filter with the plastic base, according to claim 1, wherein the base-side adjacent layer or the opposite-side adjacent layer is a silica compound layer formed from a silica compound.

4. The neutral density filter with the plastic base, according to claim 1, wherein the $SiO_2$ layer or the $Al_2O_3$ layer has a density as obtained when deposition is performed without ion-assisting.

5. The neutral density filter with the plastic base, according to claim 1, wherein the light absorbing film is formed by low refractive index layers and high refractive index layers being alternately disposed.

6. The neutral density filter with the plastic base, according to claim 1, wherein the base has a front surface and a back surface, and
the light absorbing film is disposed on the back surface.

7. The neutral density filter with the plastic base, according to claim 6, wherein an antireflection film is disposed on the front surface.

8. A neutral density filter with a plastic base for eyeglasses, the neutral density filter comprising the neutral density filter with the plastic base, according to any one of claim 1 to claim 7.

* * * * *